United States Patent
Kato et al.

[11] Patent Number: 6,064,696
[45] Date of Patent: *May 16, 2000

[54] ENCODING APPARATUS

[75] Inventors: Masato Kato, Inagi; Yoshitaka Kakuta, Urawa, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/757,899

[22] Filed: Nov. 27, 1996

Related U.S. Application Data

[63] Continuation of application No. 08/341,931, Nov. 15, 1994.

[30] Foreign Application Priority Data

Nov. 17, 1993 [JP] Japan .................................. 5-288265

[51] Int. Cl.[7] ................................ H04N 7/18
[52] U.S. Cl. .................. 375/240; 348/420; 348/421; 348/390; 348/395; 348/405
[58] Field of Search ................... 348/420, 390, 348/384, 395, 403, 404, 445, 418, 405, 416, 422, 421; 375/240

[56] References Cited

U.S. PATENT DOCUMENTS

| | | |
|---|---|---|
| 4,769,826 | 9/1988 | Kubo et al. ............................ 348/418 |
| 4,949,389 | 8/1990 | Allenbach et al. ...................... 359/29 |
| 5,237,410 | 8/1993 | Inoue ..................................... 348/409 |
| 5,337,049 | 8/1994 | Shimoda ................................ 348/420 |
| 5,363,146 | 11/1994 | Saunders et al. ...................... 348/443 |
| 5,367,334 | 11/1994 | Nishino et al. ........................ 348/390 |

*Primary Examiner*—Andy Rao
*Attorney, Agent, or Firm*—Fitzpatrick Cella Harper & Scinto

[57] ABSTRACT

An encoding apparatus for block forming input information data and encoding includes, a generating section for generating data from input information data, and a block forming section for adding the information data generated by the generating section to the input information data, thereby forming a block.

32 Claims, 5 Drawing Sheets

ENCODING APPARATUS

This invention is a continuation of application Ser. No. 08/341,931 filed Nov. 15, 1994.

BACKGROUND OF THE INVENTION

1. Field of the Invention

The present invention relates to an encoding apparatus and, more particularly, to an encoding apparatus for performing block encoding.

2. Related Background Art

High efficient encoding techniques are becoming more and more important in association with digitization of an image signal. Orthogonal conversion encoding is known as effective means for high efficient encoding.

The orthogonal conversion encoding which intends to convert a time sequence signal which is inputted to an orthogonal component (for example, frequency component) and a DCT (Discrete Cosine Transformation) is well known.

An image encoding method using the DCT will now be described. FIG. 1 is a block diagram of a conventional image encoding apparatus using DCT.

In FIG. 1, reference numeral 101 denotes an input terminal for a digital image signal; 102 a block forming circuit; 103 a DCT circuit; 104 a quantization circuit; 105 a variable length encoding circuit; 106 a buffer memory; and 107 an output terminal.

An image encoding process of the encoding apparatus constructed as mentioned above will now be described.

The digital image signal inputted to the input terminal 101 is divided into blocks on a DCT unit basis by the block forming circuit 102. A 2-dimensional DCT of total 64 pixels (8 pixels in the horizontal direction×8 pixels in the vertical direction) is often used in the image encoding. The block formed image signal is 2-dimensional DCT transformed by the DCT circuit 103 and is converted into a DCT component. The converted DCT component is quantized by the quantization circuit 104 and is variable length encoded by the variable length encoding circuit 105 and is converted at a predetermined rate by the buffer memory 106 and is outputted.

The variable length encoding is an encoding system for assigning a small code length to a code word of a large occurrence probability and for assigning a large code length to a code word of a small occurrence probability. Therefore, a data rate after completion of the encoding changes in dependence on picture quality. Accordingly, in order to prevent the occurrence of an overflow or underflow of the buffer memory 106, when a data amount in the buffer memory 106 increases, a quantization width at the time of the quantization is increased in the quantization circuit 104, and when the data amount decreases, the quantization width is decreased, thereby controlling the data amount.

However, in the case of block encoding as mentioned above, when an effective image area is divided by an encoding block, there is a situation such that the entire effective image area cannot be divided by the size of encoding block.

Specifically, a situation as shown in FIG. 2 occurs.

In FIG. 2, assuming that the effective image area is an area of 1920 pixels in width and 1035 pixels in length, in a case of dividing the effective image area into (8×8) blocks of the size of (8 pixels in width)×(8 pixels in length) and encoding, the number of pixels in width of the effective image area can be divided because it is a multiple of 8. However, the number of pixels in length cannot be divided since it is not a multiple of 8. Namely, the effective image area of such a size cannot be divided into (8×8) equal blocks.

Therefore, in order to enable the effective image area to be divided into (8×8) blocks of the same size, image data of a predetermined level (gray level, black level, white level, or the like) is added as sufficient image data in FIG. 2, thereby making it possible to equally divide the area to (8×8) blocks of the same size.

In case of block encoding by adding, for instance, the data of the black level, however, when the true image data which really exists in the encoding block is the signal of the flat white level, the data becomes block data which changes from white to black at a boundary between the true image data and the added dummy image data in the encoding block. When such data is DCT transformed, although only the DC component exists in the original image data, a coefficient occurs in the vertical AC component. When such a DCT component is variable length encoded, the AC component which doesn't exist in the original image signal is generated, so that the data amount increases. Since the accumulation amount in the buffer memory increases, a process to increase a step width of the quantization is executed in order to reduce the data amount.

There is, consequently, a problem such that the quality of the decoded picture deteriorates in dependence on the image. Particularly, such a deterioration causes a problem in the case where an image of a high quality such as a high vision signal is compressed at a high compression ratio.

SUMMARY OF THE INVENTION

Under such circumstances, it is an object of the present invention to provide an encoding apparatus in which when information data is divided into blocks and is encoded, in the case where the input information data cannot be equally divided into blocks of a predetermined size, the deterioration of the picture quality as in the conventional apparatus does not occur.

To accomplish the above object, according to one preferred embodiment of the invention, there is provided an encoding apparatus for block forming input information data and encoding, wherein the apparatus comprises generating means for generating data from the input information data and block forming means for adding the information data generated by the generating means to the input information data and block forming.

Other objects, features and advantages of the invention will become apparent from the following detailed description taken in conjunction with the accompanying drawings.

DETAILED DESCRIPTION OF THE PREFERRED EMBODIMENT

An encoding apparatus of an embodiment according to the invention is described below.

Figure 1:
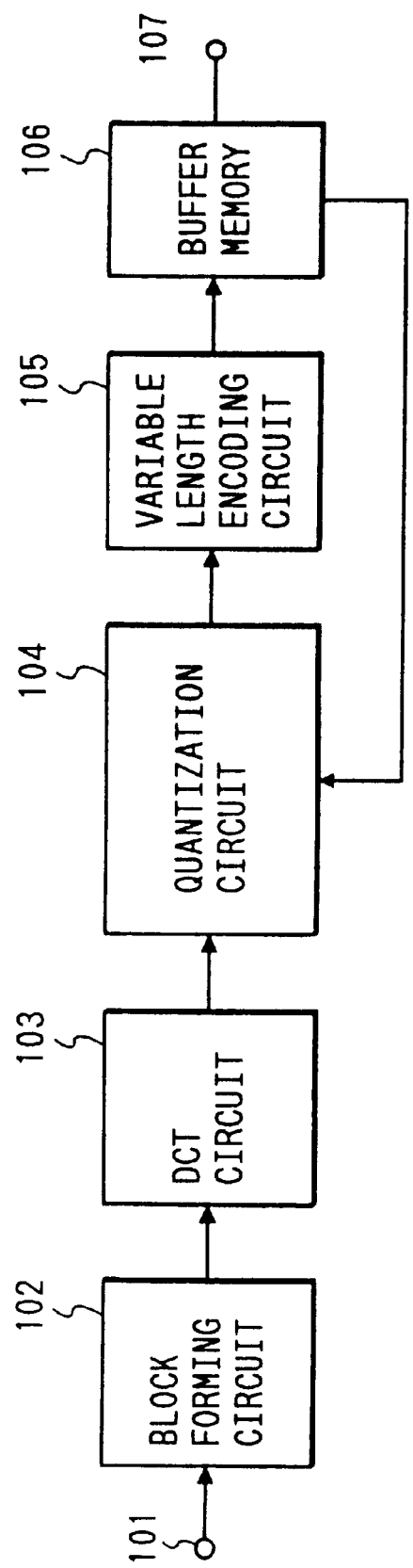
FIG. 1 is a block diagram of a conventional image encoding apparatus using DCT.
Figure 2:
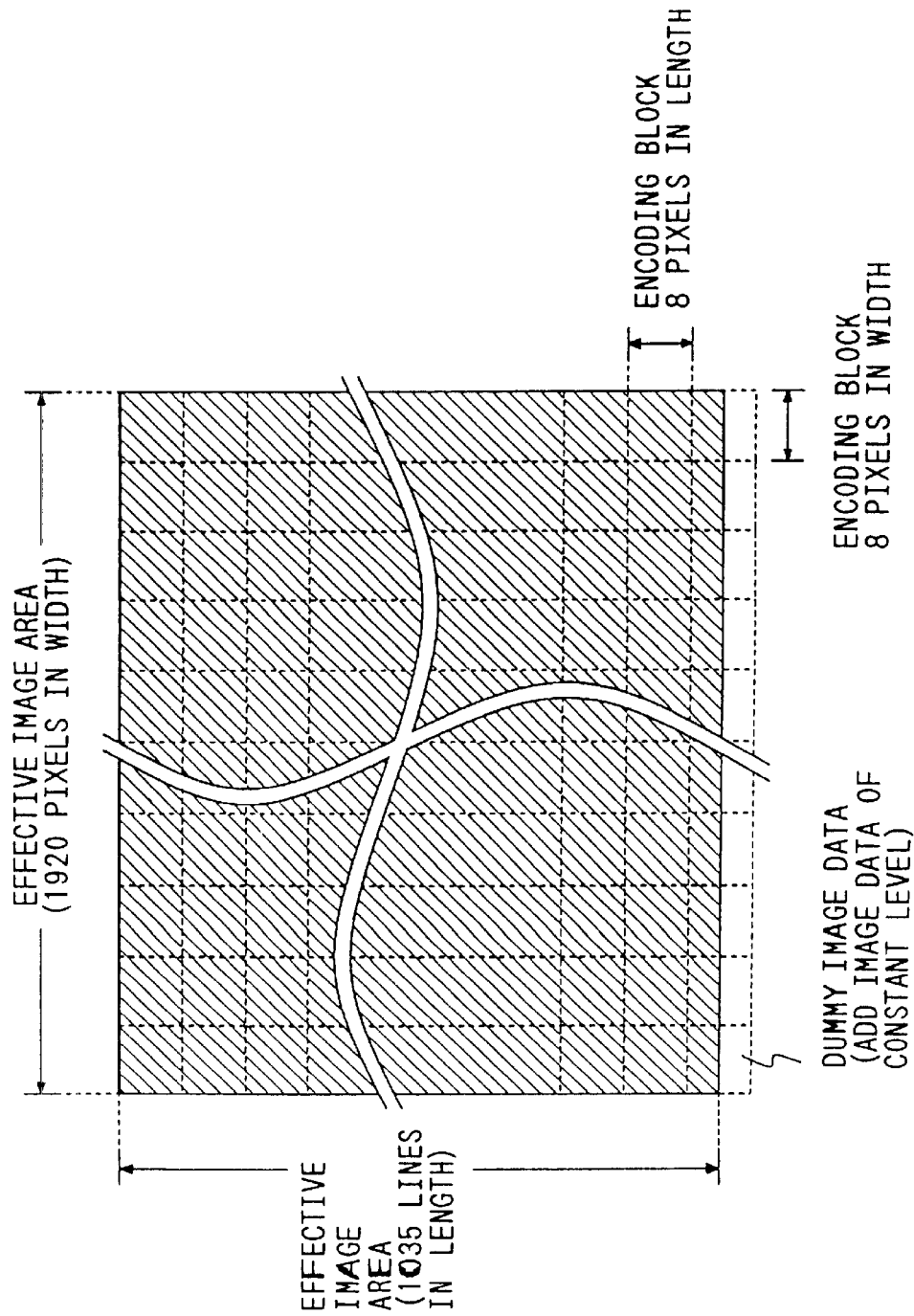
FIG. 2 is a diagram for explaining the relation between the effective image area and the block division.
Figure 3:
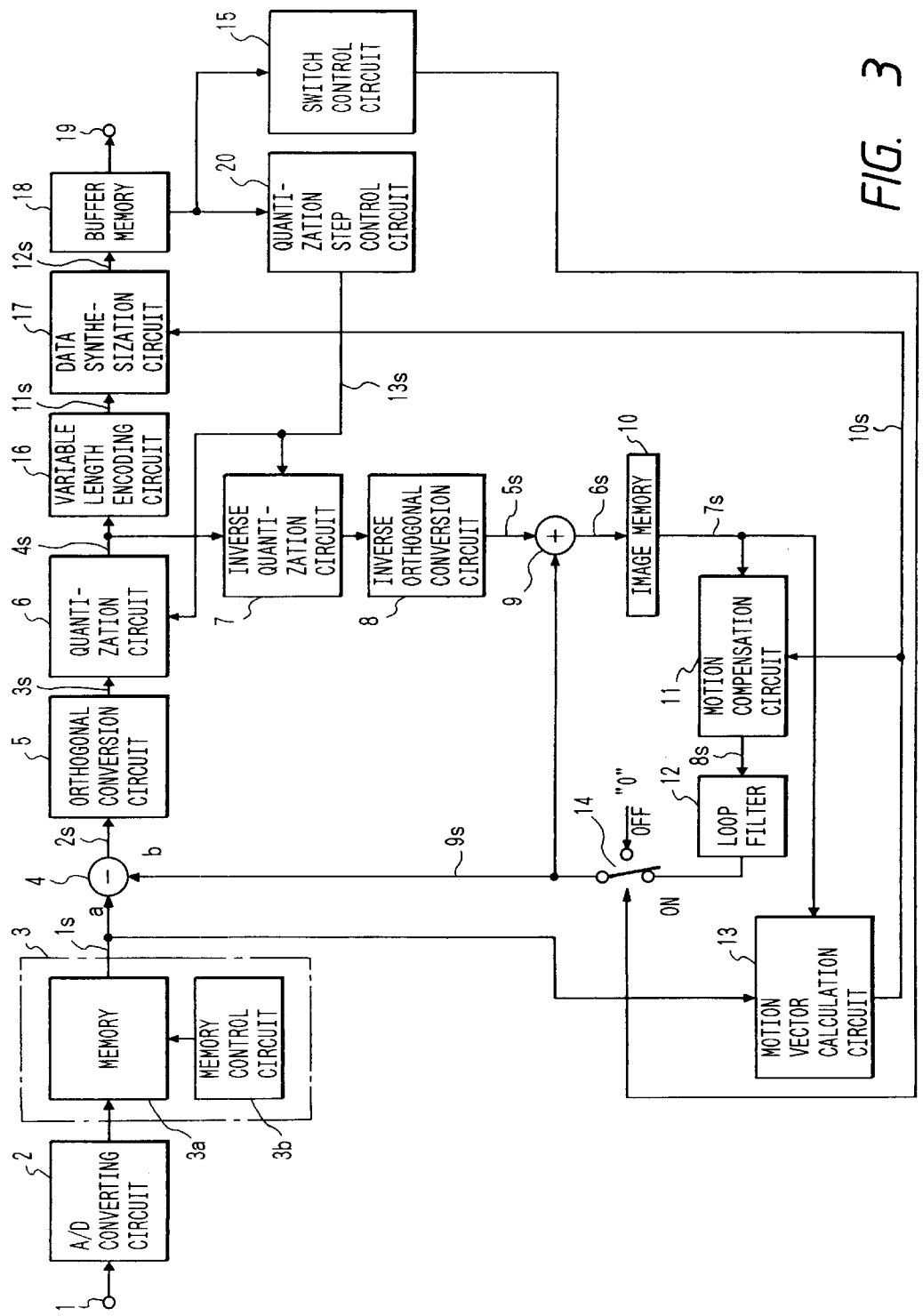
FIG. 3 is a block diagram of an encoding apparatus of an embodiment according to the invention.

FIG. 3 is a block diagram of the encoding apparatus of the embodiment according to the invention.

In FIG. 3, reference numeral 1 denotes an input terminal to which an analog image signal is inputted; 2 an A/D converting circuit for converting the inputted analog signal to a digital signal; 3 a block forming circuit for dividing the A/D converted digital image signal into block data of (8 pixels in width×8 pixels in length); 4 a prediction error calculation circuit for calculating a difference between a present frame image signal 1s of an encoding block and a prediction signal 9s, which will be explained later, thereby calculating a prediction error; 5 an orthogonal conversion circuit for orthogonal converting a prediction error signal 2s [for example, a DCT (Discrete Cosine Transforming circuit)]; and 6 a quantization circuit for quantizing an orthogonal conversion coefficient 3s.

Reference numeral 7 denotes an inverse quantization circuit for inverse quantizing a quantized orthogonal conversion coefficient (prediction error signal) 4s; 8 an inverse orthogonal conversion circuit for inverse orthogonal converting the inverse quantized orthogonal conversion coefficient; 9 a reproduction image calculation circuit for calculating a reproduction image of the present frame by a prediction error signal 5s and the prediction signal 9s; 10 an image memory circuit for storing a reproduction image signal 6s of the present frame; 11 a motion compensation circuit for motion compensating a reproduction image signal 7s of the previous frame; and 12 a loop filter circuit for performing a 2-dimensional low-pass filtering process to a motion compensation signal 8s, thereby outputting a prediction signal 9s.

Reference numeral 13 denotes a motion vector calculation circuit for comparing the present frame image signal is which was block formed and the reproduction image signal 7s of the previous frame, thereby calculating a motion vector 10s of the block; 14 a switch for forcedly setting the prediction signal 9s for motion compensation to "0"; and 15 a switch control circuit for turning the switch 14 on/off in accordance with a data accumulation amount of a buffer memory 18, thereby switching between a mode for performing an interframe motion compensation prediction encoding and a mode for executing an intrafield encoding for a time period of one frame.

Reference numeral 16 denotes a variable length encoding circuit for variable length encoding the prediction error signal 4s; 17 a data synthesization circuit for constructing transmission frame encoding data 12s in response to a prediction error signal 11s and the motion vector 10s; 18 a buffer memory for transmitting the transmission frame encoding data 12s at a predetermined transmission speed; and 19 an output terminal for outputting a transmission signal from the buffer memory 18.

Reference numeral 20 denotes a quantization step control circuit for generating a control signal 13s indicative of a quantization step to control data generation amounts of the quantization circuit 6 and inverse quantization circuit 7 in accordance with the data amount in the buffer memory 18.

The encoding processing operation of the encoding apparatus constructed as mentioned above will now be described.

The analog image signal inputted to the input terminal 1 is converted to the digital signal by the A/D converting circuit 2. The image signal which is inputted is a signal in a raster scan state. It is assumed that the number of effective image lines is set to 517 or 518/field and the number of effective pixels is set to 1920/line.

The converted digital image signal is divided into (8×8) blocks by the block forming circuit 3. A process of the block forming circuit 3 will now be described in detail.

Now, assuming that the number of effective image lines of the inputted image signal is set to 517 or 518/field and the number of effective pixels is equal to 1920/line, the effective pixels in the horizontal direction can be divided into just 240 equal portions: namely, (the number of effective pixels)/(the number of horizontal pixels of the encoding block)=1920/8=240

The effective lines in the vertical directions cannot be equally divided: namely, (the number of effective lines)/(the number of vertical pixels of the encoding block)=(517 or 518)/8=(64+5/8) or (64+6/8)

If the data of three or two further lines exists, the effective lines can be divided into just 65 equal portions. According to the embodiment, therefore, image data of three or two lines is generated, thereby setting the number of effective lines in the vertical direction to just 520 lines and enabling them to be divided to just 65 equal portions.

Figure 4:
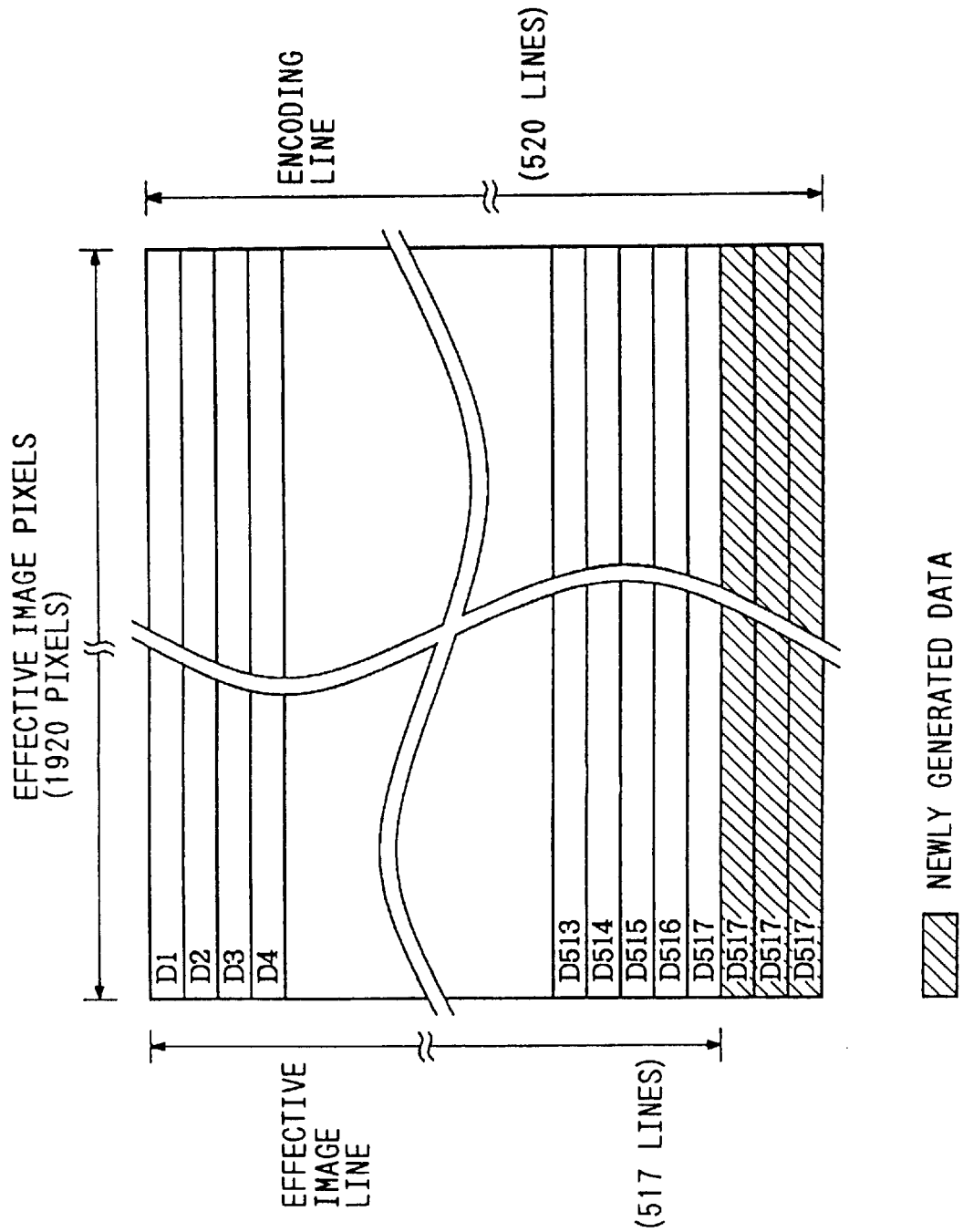
FIG. 4 is a diagram for explaining the case where image data in which the number of effective image lines is equal to a 517/field is divided into blocks in the embodiment according to the invention.

FIG. 4 is a diagram for explaining the case of block dividing the image data in which the number of image effective lines is equal a 517/field.

When the number of effective image lines is equal to 517/field, the data of 517 lines as a final line of the image effective lines is supplemented as data of 518 to 520 lines, thereby enabling the effective image lines to be divided into just 65 portions. To accomplish the above process, the block forming circuit 3 comprises a memory 3a and a memory control circuit 3b. The memory control circuit 3b controls the reading operation of the memory 3a and reads out the data of the final line a number of times as mentioned above for the block having insufficient data, thereby outputting the block data of a predetermined size from the memory 3a.

The present frame image signal 1s divided as mentioned above is inputted to an (a) input terminal of the prediction error calculation circuit 4 and the motion vector calculation circuit 13. The prediction signal 9s is inputted to a (b) input terminal of the prediction error calculation circuit 4 from the loop filter circuit 12 when the switch 14 is on. A difference between the prediction signal 9s and the present frame image signal 1s is calculated and the result is generated as a prediction error signal 2s.

The orthogonal conversion circuit 5 executes the orthogonal conversion to the prediction error signal 2s from the prediction error calculation circuit 4 and generates the prediction error orthogonal conversion coefficient 3s.

As an orthogonal conversion system, in many cases, a discrete cosine transformation (DCT) which has a high converting efficiency and which can be practically realized as hardware is used.

The quantization circuit 6 quantizes the prediction error orthogonal conversion coefficient 3s and calculates a prediction error orthogonal conversion quantization coefficient and outputs the prediction error signal 4s.

In this instance, the quantization step of the quantization circuit 6 is controlled by the quantization step control circuit 20, thereby enabling a data generation amount to be varied. By monitoring the data accumulation amount of the buffer memory 18, the quantization step is controlled by the control signal 13s so as not to exceed a predetermined transmission rate which is outputted from the output terminal 19.

For example, when the data accumulation amount of the buffer memory 18 is large, the quantization circuit 6 is made operative by a quantization step such as to reduce the data generation amount, thereby decreasing the data accumulation amount to a specified value. When the data accumulation amount is small, on the contrary, the quantization circuit 6 is made operative by a quantization step so as to increase the data generation amount, thereby increasing the data accumulation amount to a specified value.

The inverse quantization circuit 7 performs the inverse orthogonal conversion to the inverse quantization output and adds the prediction error signal 5s including the quantization and inverse quantization errors and the prediction signal 9s of the output of the loop filter circuit 12 when the switch 14 is on, thereby calculating the present frame reproduction image signal 6s of the encoding block.

The image memory circuit 10 stores the reproduction image signal 6s of the present frame and outputs the reproduction image signal 7s of the previous frame.

The motion vector calculation circuit 13 compares the image signal 1s of the present frame and the reproduction image signal 7s of the previous frame stored in the image memory 10, thereby calculating the motion of the encoding block as a vector 10s.

The motion compensation circuit 11 motion compensates the reproduction image signal 7s of the previous frame by the motion vector 10s and generates as a motion compensation signal 8s. The loop filter circuit 12 executes a 2-dimensional low-pass filtering process to the signal 8S from the motion compensated encoding block and outputs as a prediction signal 9s. The prediction signal 9s is supplied to the prediction error calculation circuit 4 and reproduction image calculation circuit 9 when the switch 14 is on.

A process of the loop filter circuit 12 will now be described in detail. In the embodiment, a 2-dimensional filter of (3×3) is used as a loop filter. Namely, a total of nine (3×3) pixels are necessary for a calculation resulting in one pixel.

Figure 5A:
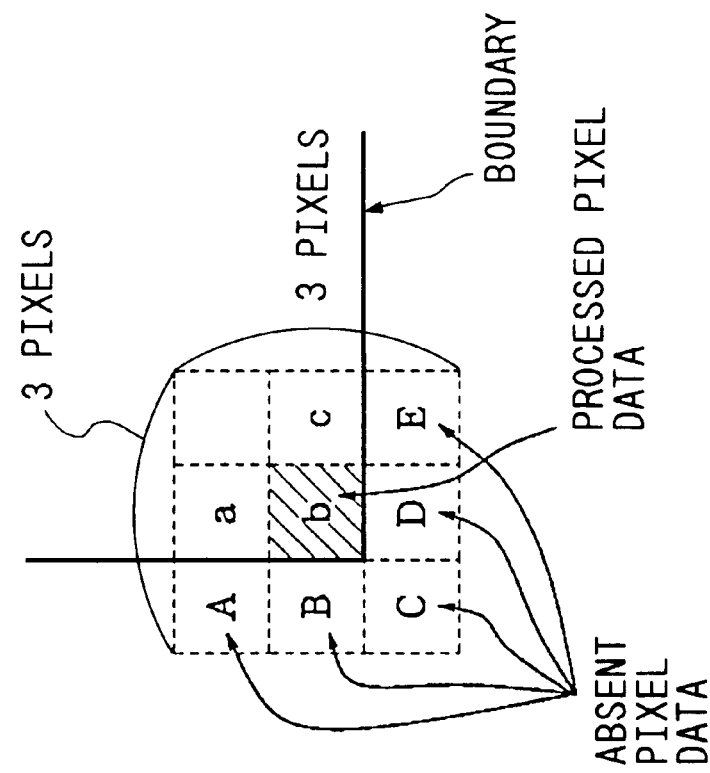
FIGS. 5A and 5B are diagrams for explaining a loop filtering process in the embodiment according to the invention.
Figure 5B:
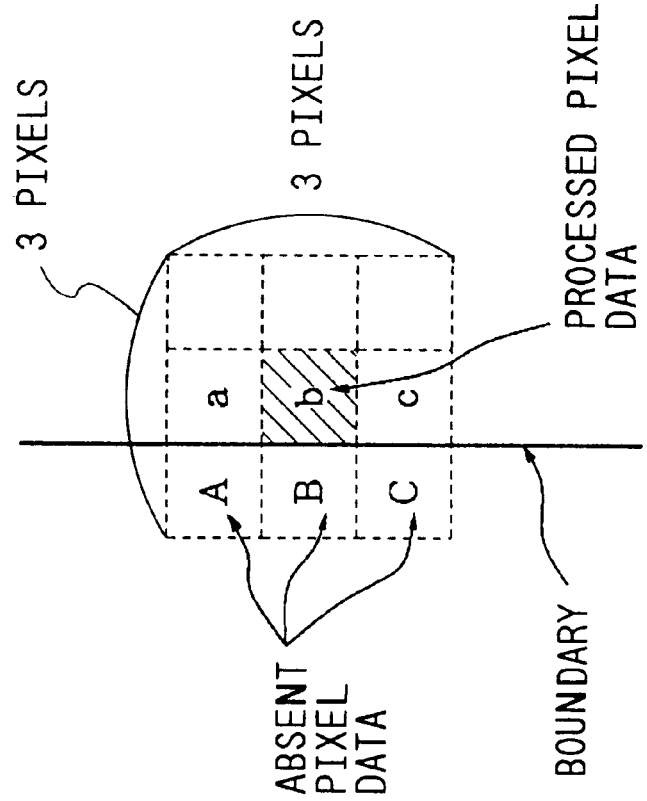

Therefore, in the case where the pixels to be processed exist at an edge of an image area (refer to FIGS. 5A and 5B), for example, in the case as shown in FIG. 5A, namely, the data of three pixels A, B, and C doesn't exist. In the embodiment, therefore, the absent three pixel data is compensated for by the existing pixel data. In other words, a filtering process is executed while setting such that A=a, B=b, and C=c. In case of FIG. 5B, data of five pixels A, B, C, D, and E doesn't exist. Therefore, in the embodiment, a filtering process is executed while setting A=a, B=C=D=b, and E=c. The average value of a plurality of existing pixel data can also be set to the absent pixel data.

Returning to the description of the processing operation of FIG. 3, the variable length encoding circuit 16 rearranges the prediction error signal (orthogonal conversion quantization coefficient) 4s from the quantization circuit 6 and variable length encodes and generates the prediction error code 11s.

The data synthesization circuit 17 encodes the motion vector 10s and synthesizes with the prediction error code 11s and generates the transmission frame encoding data 12s of a predetermined format.

The buffer memory 18 temporarily stores the transmission frame encoding data 12s and generates an output signal at the output terminal 19 at a predetermined transmission rate.

When an error occurs on a transmission path from a point where the data is outputted from the buffer memory 18 to a point where it is inputted to the decoding apparatus, errors are accumulated for a period of time during which the apparatus operates as a motion compensation prediction interframe encoding apparatus. Therefore, the switch 14 needs to be turned off at a proper timing. The switch control circuit 15 monitors the data accumulation amount of the buffer memory 18, thereby controlling the switch 14.

For example, in the case where the data accumulation amount of the buffer memory 26 is large, the switch 14 is held in the on state, thereby making the apparatus operative as an interframe motion compensation prediction encoding apparatus. When the data accumulation amount of the buffer memory 18 is small, contrarily, the switch 14 is turned off, thereby executing the intrafield encoding for a period of time of one frame.

It is sufficient to turn off the switch 14 once in accordance with the data accumulation amount of the buffer memory 18 every predetermined time as mentioned above in accordance with the error state of the data transmission path. When the entire data accumulation amount of the buffer memory 16 is small, however, it is sufficient to turn off the switch 14 for a predetermined time.

According to the encoding apparatus of the embodiment as described above, in the encoding apparatus for dividing the input image data into blocks and encoding, when the input image data is divided into blocks, the data is generated from the input image data and the generated image data is added to the input image data, thereby forming the blocks. Therefore, in the case where the input image data cannot be equally divided into predetermined blocks of the same size, the deterioration of the picture quality as in the conventional apparatus does not occur.

The present invention can be embodied by other various forms without departing from the spirit and main features of the invention.

For example, although the block forming process has been performed so that the signal out of the effective image area is included in the encoding block in the lower edge portion of the encoding area in the embodiment, the block forming process can be also performed so that the signal is included in the encoding block in the upper edge portion of the encoding area. In this case, it is sufficient that the data of the first one of the effective lines is replaced by the data other than the effective lines.

In the embodiment, although the encoding area in the horizontal direction is equal to the effective pixel, when they are not equal, in a manner similar to the case in the vertical direction, it is also possible to perform the block forming process so that the pixels at both of the right and left edges of the effective pixels are replaced by the data other than the effective area.

The size the encoding block and the size the block of the loop filtering process are not limited to the sizes of the blocks described in the embodiment.

In other words, the foregoing description of the embodiment has been given for illustrative purposes only and not to be construed as imposing any limitation in every respect.

The scope of the invention is, therefore, to be determined solely by the following claims and is not limited by the text of the specification and alterations made within a scope equivalent to the scope of the claims fall within the true spirit and scope of the invention.

What is claimed is:

1. An encoding apparatus comprising:
   input means for inputting image data;
   dividing means for dividing the image data into a plurality of blocks, said dividing means including means for producing supplementary data from the image data wherein the supplementary data has an information content based on an information content of the image data, and means for adding the supplementary data to the image data so that a number of samples in one picture of the combined image data is an integral multiple of a number of samples in one block, and wherein a number of samples in one picture of the image data input by said input means is not the integral multiple of the number of samples in one block; and encoding means for encoding the image data in units of blocks.

2. An apparatus according to claim 1, wherein said encoding means includes converting means for orthogonal converting the image data of the block divided by said dividing means, and quantizing means for quantizing the image data converted by said converting means.

3. An apparatus according to claim 1, wherein each block is constructed of a plurality of collected pixels, and the number of pixels in one picture of the digital image data is not an integer times as large as the number of pixels constructing the block.

4. An image encoding apparatus comprising:
   a) input means for inputting digital image data;
   b) generating means for generating a predictive value from image data of a picture adjacent to present image data, in which said generating means has filtering means, said filtering means forming, with respect to predicted image data to generate said predictive value, a filtering block comprising a predetermined number of pixels by using image data surrounding the predictive image data, and said filtering means forming the filtering block by making up a shortage of image data by using the image data of the picture, when the predictive image data exists at the edge of the picture and the filtering block cannot be formed because of lack of image data;
   c) subtracting means for subtracting the predictive value generated by said generating means from the image data input by said input means; and
   d) encoding means for encoding the image data which is output from said subtracting means.

5. An apparatus according to claim 4, further having block forming means for block forming the digital image data inputted by said input means,
   and wherein the digital image data which was block formed by said block forming means is inputted to said subtracting means.

6. An apparatus according to claim 5, wherein said block forming means includes means for producing supplementary data from the digital image data inputted by said input means and adding said supplementary data to said digital image data and executes a block division to the added digital image data.

7. An encoding method comprising the steps of:
   inputting image data;
   dividing the image data into a plurality of blocks, said dividing step including a step of producing supplementary data from the image data, wherein the supplementary data has an information content based on an information content of the image data, and a step of adding the supplementary data to the image data so that a number of samples in one picture of the combined image data is an integral multiple of a number of samples in one block, and wherein a number of samples in one picture of the image data input in said input step is not the integral multiple of the number of samples in one block; and
   encoding the image data in units of blocks.

8. An image encoding method comprising the steps of:
   a) inputting digital image data;
   b) generating a predictive value from image data of a picture adjacent to present image data, said generating step including a filtering step of forming, with respect to predicted image data to generate said predictive value, a filtering block comprising a predetermined number of pixels by using image data surrounding the predictive image data, wherein, in said filtering step, the filtering block is formed by making up a shortage of image data by using the image data of the picture, when the predictive image data exists at the edge of the picture and the filtering block cannot be formed because of lack of image data;
   c) subtracting the predictive value generated in said generating step from the image data input in said input step; and
   d) encoding the image data which is output in said subtracting step.

9. An encoding apparatus comprising:
   input means for inputting pixel data of one picture comprising a plurality of pixels;
   generation means for generating supplementary pixel data from the pixel data input by said input means, wherein the supplementary pixel data has an information content based on an information content of the pixel data input by said input means;
   block forming means for forming a block constructed of a predetermined number of pixels, by adding the supplementary pixel data to the pixel data input by said input means, said block forming means adding the supplementary pixel data to the pixel data to obtain combined pixel data, wherein a number of pixels in the combined pixel data for the one picture is an integral multiple of the predetermined number of pixels in one block, and wherein a number of the pixels of one picture input by said input means is not an integral multiple of a number of pixels of one block; and
   encoding means for compression-encoding the combined pixel data in units of blocks.

10. An apparatus according to claim 9, wherein said plurality of pixels constructing one picture are not equally divided into the blocks in the row or column direction of one picture.

11. An apparatus according to claim 10, wherein the supplementary pixel data is added to the pixel data input by said input means so that the addition data can be equally divided into the blocks.

12. An apparatus according to claim 9, wherein said block forming means forms the block positioned at the edge of the picture, by using the supplementary pixel data.

13. An apparatus according to claim 10, wherein said block forming means forms the block positioned at the edge of the picture, by using the supplementary pixel data.

14. An apparatus according to claim 11, wherein said block forming means forms the block positioned at the edge of the picture, by using the supplementary pixel data.

15. An apparatus according to claim 9, wherein said encoding means includes converting means for orthogonal converting the pixel data of the block, and quantizing means for quantizing the pixel data converted by said converting means.

16. An apparatus according to claim 10, wherein said encoding means includes converting means for orthogonal converting the pixel data of the block, and quantizing means for quantizing the pixel data converted by said converting means.

17. An apparatus according to claim 11, wherein said encoding means includes converting means for orthogonal converting the pixel data of the block, and quantizing means for quantizing the pixel data converted by said converting means.

18. An apparatus according to claim 12, wherein said encoding means includes converting means for orthogonal converting the pixel data of the block, and quantizing means for quantizing the pixel data converted by said converting means.

19. An apparatus according to claim 13, wherein said encoding means includes converting means for orthogonal converting the pixel data of the block, and quantizing means for quantizing the pixel data converted by said converting means.

20. An apparatus according to claim 14, wherein said encoding means includes converting means for orthogonal converting the pixel data of the block, and quantizing means for quantizing the pixel data converted by said converting means.

21. An encoding method comprising the steps of:

inputting pixel data for one picture comprising a plurality of pixels;

generating supplementary pixel data from the pixel data input in said inputting step, wherein the supplementary pixel data has an information content based on an information content of the pixel data input in said inputting step;

forming a block constructed of a predetermined number of pixels, by adding the supplementary pixel data to the pixel data input in said inputting step, wherein said block forming step includes the step of adding the supplementary pixel data to the pixel data to obtain combined pixel data, wherein a number of pixels in the combined pixel data for the one picture is an integral multiple of the predetermined number of pixels in one block, and wherein a number of the pixels of one picture input in said input step is not an integral multiple of a number of pixels of one block; and the compression-encoding the combined pixel data in units of blocks.

22. A method according to claim 21, wherein said plurality of pixels constructing one picture are not equally divided into the blocks in the row or column direction of one picture.

23. A method according to claim 22, wherein the supplementary pixel data is added to the pixel data input in said input step so that the addition data can be equally divided into the blocks.

24. A method according to claim 21, wherein in said block forming step, the block positioned at the edge of the picture is formed by using the supplementary pixel data.

25. A method according to claim 22, wherein in said block forming step, the block positioned at the edge of the picture, is formed by using the supplementary pixel data.

26. A method according to claim 23, wherein in said block forming step, the block positioned at the edge of the picture, is formed by using the supplementary pixel data.

27. A method according to claim 21, wherein said encoding step includes a converting step of orthogonally converting the pixel data of the block, and a quantizing step of quantizing the pixel data converted in said converting step.

28. A method according to claim 22, wherein said encoding step includes a converting step of orthogonally converting the pixel data of the block, and a quantizing step of quantizing the pixel data converted in said converting step.

29. A method according to claim 23, wherein said encoding step includes a converting step of orthogonally converting the pixel data of the block, and a quantizing step of quantizing the pixel data converted in said converting step.

30. A method according to claim 24, wherein said encoding step includes a converting step of orthogonally converting the pixel data of the block, and a quantizing step of quantizing the pixel data converted in said converting step.

31. A method according to claim 25, wherein said encoding step includes a converting step of orthogonally converting the pixel data of the block, and a quantizing step of quantizing the pixel data converted in said converting step.

32. A method according to claim 26, wherein said encoding step includes a converting step of orthogonally converting pixel data of the block, and a quantizing step of quantizing the pixel data converted in said converting step.

* * * * *

UNITED STATES PATENT AND TRADEMARK OFFICE
CERTIFICATE OF CORRECTION

PATENT NO. : 6,064,696

DATED : May 16, 2000

INVENTOR(S) : MASATO KATO ET AL.

It is certified that error appears in the above-identified patent and that said Letters Patent is hereby corrected as shown below:

ON THE TITLE PAGE [56] References Cited:

U.S. PATENT DOCUMENTS, "Allenbach et al." should read --Allebach et al.--; and

Attorney, Agent, or Firm, "Fitzpatrick Cella Harper & Scinto" should read --Fitzpatrick, Cella, Harper & Scinto--.

COLUMN 3:

Line 38, "signal is" should read --signal 1s--.

COLUMN 5:

Line 29, "signal 85" should read --signal 8S--.

COLUMN 6:

Line 5, "memory 26" should read --memory 18--;
    Line 16, "memory 16" should read --memory 18--; and
    Line 52, "not" should read --is not--.

COLUMN 9:

Line 40, "the" (first occurrence) should be deleted.

UNITED STATES PATENT AND TRADEMARK OFFICE
CERTIFICATE OF CORRECTION

PATENT NO.  : 6,064,696

DATED       : May 16, 2000

INVENTOR(S) : MASATO KATO ET AL.

It is certified that error appears in the above-identified patent and that said Letters Patent is hereby corrected as shown below:

COLUMN 10:

Line 12, "picture," should read --picture--; and
    Line 15, "picture," should read --picture--.

Signed and Sealed this

Twenty-second Day of May, 2001

Attest:

NICHOLAS P. GODICI

Attesting Officer     Acting Director of the United States Patent and Trademark Office